United States Patent
Kakovitch et al.

(10) Patent No.: US 12,210,913 B1
(45) Date of Patent: Jan. 28, 2025

(54) CHAINED TASKS FOR EXECUTION IN AN ON-DEMAND NETWORK CODE EXECUTION SYSTEM

(71) Applicant: Amazon Technologies, Inc., Seattle, WA (US)

(72) Inventors: Christopher Kakovitch, Seattle, WA (US); Rajesh Kumar Pandey, Seattle, WA (US); Arijit Ganguly, Kirkland, WA (US); Luben Karavelov, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 677 days.

(21) Appl. No.: 17/449,636

(22) Filed: Sep. 30, 2021

(51) Int. Cl.
*G06F 9/50* (2006.01)
*G06F 9/455* (2018.01)
*G06F 9/54* (2006.01)

(52) U.S. Cl.
CPC ........ *G06F 9/5077* (2013.01); *G06F 9/45533* (2013.01); *G06F 9/45558* (2013.01); *G06F 9/5038* (2013.01); *G06F 9/5044* (2013.01); *G06F 2009/4557* (2013.01); *G06F 2009/45595* (2013.01); *G06F 9/547* (2013.01); *G06F 2209/502* (2013.01)

(58) Field of Classification Search
None
See application file for complete search history.

(56) References Cited

U.S. PATENT DOCUMENTS

2018/0165114 A1* 6/2018 Nishijima ........... G06F 9/45533
2022/0237014 A1* 7/2022 Kurkure .................... G06T 1/20

\* cited by examiner

*Primary Examiner* — Qing Yuan Wu
(74) *Attorney, Agent, or Firm* — Knobbe, Martens, Olson & Bear, LLP

(57) ABSTRACT

Systems and methods are described for the chained execution of a set of code in an on-demand network code execution system. A user may provide a set of code for execution in the on-demand network code execution system and the system may determine that the set of code comprises multiple chained tasks. The system may provide the set of code to a first virtual machine instance for execution of a first task. The system may obtain an indication that the first task has been executed. The results of the execution of the first task may be sent to a second virtual machine instance, via a push or pull, for execution of a second task. Based on identifying that the first task has been executed, the system may instruct the second virtual machine instance to execute the second task.

20 Claims, 7 Drawing Sheets

CHAINED TASKS FOR EXECUTION IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

Virtual machines can be provisioned with multiple components or resources. For example, virtual machines can be provisioned with memory, a disk, a graphical processing unit, etc. Based on the resources provisioned for the virtual machine, a user may configure the virtual machine to implement desired functionality (e.g., to conduct computations). Specifically, users can provide a plurality of code for execution using the provisioned resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
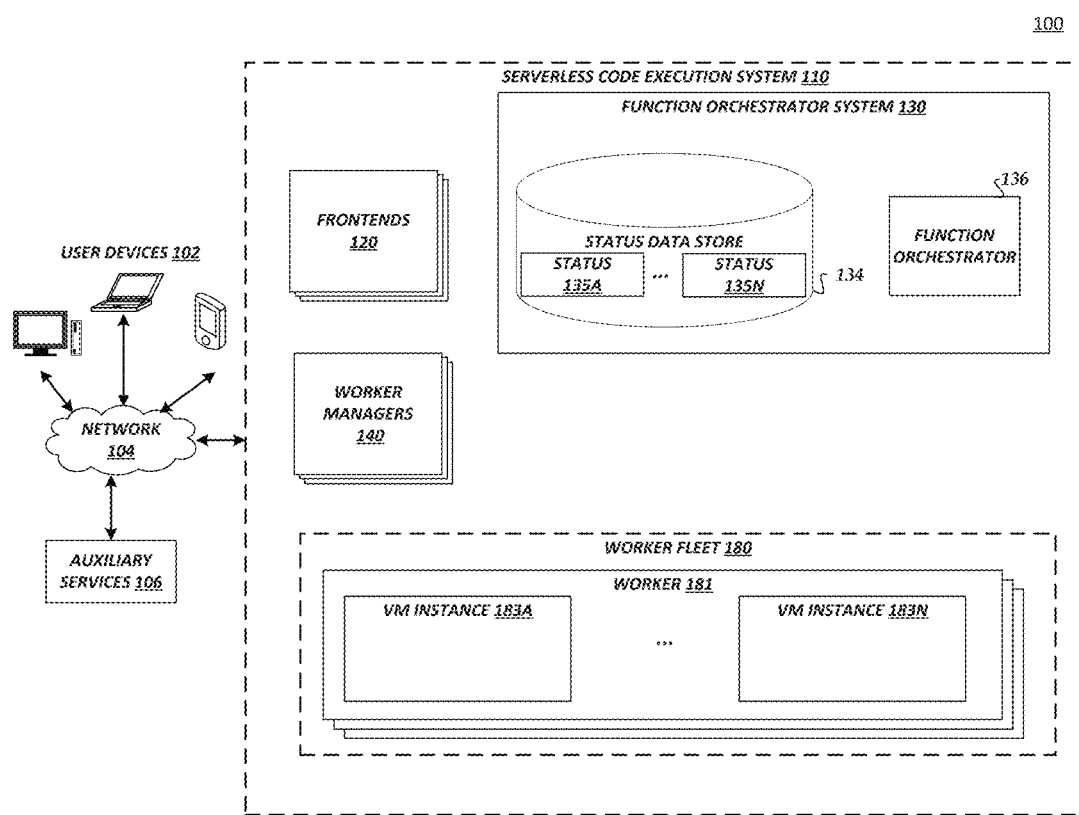
FIG. 1 is a block diagram depicting an illustrative environment in which an on-demand code execution system can execute tasks for a set of code and can identify a location of virtual machine instances.

Generally described, aspects of the present disclosure relate to the chaining of the execution of a set of code in an on-demand code execution system. The set of code may include, or may be associated with, a set of functions that perform tasks (e.g., each subset of the set of code is a function that performs a task). For example, the set of code may include a plurality of code modules and each code module of the plurality of code modules may be a function that performs a task. The execution of the set of code can be chained across multiple on-demand code execution environments. The on-demand code execution system enables users to chain the execution of a set of code (e.g., a code module, multiple code modules, etc.), which may be supplied by users of the on-demand code execution system. Further, aspects of the present disclosure relate to the identification of collocated on-demand code execution environments for the chained execution of a set of code. For example, the on-demand code execution system may enable users to chain the execution of a set of code across multiple collocated on-demand code execution environments. More specifically, embodiments of the present disclosure relate to improving the performance of an on-demand code execution system that is implemented using various computing resources. As described in detail herein, the on-demand code execution system may provide a network-accessible service enabling users to submit or designate a set of computer-executable code to be executed via virtual machine instances of the on-demand code execution system. Further, each set of code on the on-demand code execution system may define a plurality of "tasks" to execute the set of code and implement specific functionality corresponding to each task when executed on a virtual machine instance of the on-demand code execution system. For example, a user may submit a script in a specific programming language (e.g., the PYTHON™ language) that, when executed, implements network-based processing for a user-facing application (e.g., a mobile device "app"). In order to enable increased functionality for users of the on-demand code execution system, individual tasks may be chained together. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may thus allow users to execute code (via a defined plurality of tasks) in a serverless environment (e.g., one in which the underlying server is not under user control). The serverless environment then enables the user to submit "calls" to execute that script, at which point the system will securely execute the script to provide the desired functionality. Unlike some other network-based services, a serverless environment can remove the need for a user to maintain or configure a computing device, either virtual or physical, to support code execution. It is this lack of need for a user to maintain a device that leads to the "serverless" moniker, though of course the serverless environment itself, as opposed to individual users, likely maintains servers to support code execution. Serverless environments can be particularly well suited for processes with varying demand, as the serverless environments can rapidly scale up and down the computing resources used to service such processes. In comparison to traditional systems using dedicated servers (physical or virtual), serverless environments often provide much higher efficiency with respect to computing resources used. The serverless environment may enable the generation of virtual machine instances for the execution of a set of code. The on-demand code execution system may dynamically spin up virtual machine instances based on receiving a request to implement a set of code. For example, the on-demand code execution system may dynamically spin up a virtual machine instance for execution of a set of code. The on-demand code execution system may utilize the virtual machine instance to execute the set of code. Upon receiving a subsequent set of code, the on-demand code execution system may spin up another virtual machine instance to execute the subsequent set of code.

Events defined by a user may trigger multiple virtual machine instances to spin up for the execution of different tasks for a set of code. For example, a user-defined event may trigger a first virtual machine instance to spin up for the execution of a first task for the set of code and a second virtual machine instance to spin up for the execution of a second task for the set of code. However, in order to execute the different tasks, a user of the on-demand code execution system may call for execution of a first task and later call for execution of a second task. The different calls may be a part of an invoke path to the on-demand code execution system. In order to implement the invoke path, the user call for execution of the first task may be routed to a first virtual machine instance via the invoke path, and the user may receive a result from the first virtual machine instance in response. In response to receiving the result, the user may call for execution of the second task via the invoke path while passing the result. For example, the user or an external service, after executing the first task, may receive the results of the execution of the first task in order for the on-demand code execution system to spin up the second virtual machine instance for the execution of the second task. Therefore, the user may utilize the results of the execution of the first task in order for the on-demand code execution system to spin up the second virtual machine instance for execution of the second task. Further, the second virtual machine instance may not be collocated to the first virtual machine instance. Instead, the first virtual machine instance and the second virtual machine instance may be located in different locations and the on-demand code execution system may not use the location of the first virtual machine instance in order to determine how to spin up the second virtual machine instance. For example, the on-demand code execution system may perform load balancing in order to identify the second virtual machine instance and the location of the second virtual machine instance may not be based on the location of the first virtual machine instance.

As noted above, one issue that may be of particular concern in serverless environments is that of a chained execution of tasks for a set of code. Further, a user may wish to enable the chained execution of tasks without receiving intermediate results via the invoke path. For example, it may be advantageous to enable the internal chained execution of tasks such that virtual machine instances directly pass results of the execution of the tasks to subsequent virtual machine instances (e.g., peer to peer transfer of results and/or data between virtual machine instances). In traditional on-demand code execution systems, as each task is executed, the results of the execution of each task may not be retained and may be passed to the user via the invoke path for implementation of a subsequent virtual machine instance for execution of a subsequent task. By passing the intermediate results to the user via the invoke path, the execution of multiple tasks is delayed and intermediate results may be unnecessarily exposed. Therefore, the chained execution of multiple tasks for a set of code can lead to inadequate user experiences as the user may be unable to execute multiple tasks for a set of code without passing intermediate results via the invoke path to the user.

Further, in order to utilize less network bandwidth and to make transfers faster, it may be advantageous to enable the chained execution of tasks on different virtual machine instances that are collocated within a certain area or location. For example, it may be advantageous to enable the chained execution of tasks on different virtual machine instances collocated within the same rack. In traditional on-demand code execution systems, as each task may be executed on a different virtual machine instance, an external coordinator may obtain the results of the execution of a first task and pass the results for the execution of a second task to a subsequent virtual machine instance. Further, the user may obtain the results of the execution of a task via the invoke path and call for execution of another task. However, the results of the execution of a particular task may not be passed to a virtual machine instance collocated to the originating virtual machine instance. Instead, the results of the execution of a particular task may be passed to any virtual machine instance (e.g., based on load balancing principles). A user may not wish to have this information located in multiple regions, data centers, racks, etc. Further, by using virtual machine instances that are not collocated, the efficiency and/or security of the execution of multiple tasks may be decreased. Therefore, in traditional on-demand code execution systems, the execution of multiple tasks for a set of code may be inefficient and/or have reduced speed as the user may be unable to execute multiple tasks using collocated virtual machine instances.

In some embodiments, a user may utilize "step" functions that enable a user to execute a "process" (e.g., a set of code) using different tasks for each step in the process. The process may be implemented as a plurality of tasks (e.g., a series or set of tasks) that are each executed using different virtual machines instances. The step functions may enable users to provide a plurality of tasks for execution on different virtual machine instances. The results of the execution of each task may be passed to the user and/or an external service and the user and/or the external service may define events to trigger subsequent virtual machine instances to spin up for subsequent tasks. However, routing the results of the execution of each task to the user and/or an external service may be inefficient. For example, passing the results of the execution of each task to a frontend system (e.g., routing the execution results to a user or an external service) to be passed to a subsequent virtual machine instance may be inefficient and resource intensive. This can lead to an inadequate performance and is generally detrimental to the goal of enabling users to seamlessly execute a plurality of tasks for a set of code.

Embodiments of the present disclosure address these problems by enabling an on-demand code execution system to internally chain the execution of tasks for a set of code. A function orchestrator of the on-demand code execution system can chain the execution of tasks by retaining status information for the execution of particular tasks and implementing subsequent tasks based on receiving a status indicating that a prior task was executed without receiving the results of the execution. By implementing tasks without receiving the results of the execution and, instead, implementing tasks based on the status of the implementation, an intermediary function orchestrator can enable virtual machine instances to push and/or pull results directly to and from other virtual machine instances. Further, the virtual machine instances can directly communicate data (e.g., results) via peer to peer communications. Such a chained execution of tasks for a set of code in a serverless environment retains the advantages offered by the use of step functions by enabling a user to define a process that includes a plurality of steps or tasks. Further, the chained execution of tasks for a set of code can reduce or eliminate performance issues caused by sending intermediate results to a frontend system, and instead passing results directly from a first virtual machine instance to a second virtual machine instance. More specifically, embodiments of the present disclosure enable each virtual machine instance to pass results of the execution of a task directly to a subsequent virtual machine instance. Further, the virtual machine instance can pass the results to the subsequent virtual machine instance without passing the results to a frontend system. The function orchestrator may dynamically assign particular tasks to particular virtual machine instances and may track the execution status of each task (e.g., may identify the status of an execution of a task, without receiving the results of the execution). As the function orchestrator assigns particular tasks to particular virtual machine instances and tracks the execution status of each task, the function orchestrator can instruct virtual machine instances on how to obtain the results of the execution of a prior task directly from a prior virtual machine instance. This can enable the efficiency of the execution of the tasks to be increased as the frontend system does not receive the results of the execution of tasks. Instead, the function orchestrator directs the virtual machine instance to a prior virtual machine instance to obtain the results based on the assignment of virtual machine instance to task and monitoring the execution status of each task. Thus, the on-demand code execution system may enable a chained execution of a plurality of tasks for a set of code.

Further, the function orchestrator of the on-demand code execution system may identify a collocated virtual machine instance for execution of particular tasks, or cause one to be spun up. The function orchestrator may identify the particular virtual machine instance based on virtual machine instances implemented for related tasks (e.g., a prior task in a plurality of tasks). Further, the function orchestrator system may identify virtual machine instances that are collocated to a first virtual machine instance. In some embodiments, another component of the on-demand code execution system (e.g., a worker manager) may identify the collocated virtual machine instances. The function orchestrator may identify a second virtual machine instance that is located the closest to, or within a threshold proximity of, a first virtual machine instance (e.g., from a plurality of virtual machine instances) and select the second virtual machine instance based on its proximity to the first virtual machine instance. For example, the second virtual machine instance and the first virtual machine instance may be located on hardware resources contained within the same rack while other virtual machine instances are not located on the same rack as the first virtual machine instance. The function orchestrator may identify virtual machine instances that are collocated within a particular account boundary, area, location, radius, network distance, etc. associated with the first virtual machine instance. For example, the function orchestrator may identify virtual machine instances within a minimum network distance of a first virtual machine instance. The function orchestrator may determine a first virtual machine that is within a particular network distance (e.g., based on hops, latency, bandwidth, or any combination thereof) of a second virtual machine instance. Further, the function orchestrator system may identify a first series of virtual machine instances that are collocated within a first radius of the first virtual machine instance and a second series of virtual machine instances that are collocated within a second radius of the first virtual machine instance. The function orchestrator may identify a desired (e.g., minimum, maximum, etc.) network distance, radius, or collocation area for execution of a subsequent task (e.g., a collocation request or collocation constraint). For example, it may be advantageous to have each task executed on the same rack or in the same region in order to increase network efficiency, decrease latency, and increase network security. In some embodiments, the function orchestrator may receive a collocation request identifying a desired network distance, radius, collocation area, etc. and select a particular virtual machine instance from the virtual machine instances that satisfy the collocation request. If the function orchestrator identifies a virtual machine instance, the function orchestrator may utilize the virtual machine instance for execution of a subsequent task. In some embodiments, if the function orchestrator does not identify a virtual machine instance that satisfies the collocation request and/or if no virtual machine instance is collocated to the prior virtual machine instance, the function orchestrator may dynamically spin up a virtual machine instance that satisfies the collocation request and/or is collocated to the prior virtual machine instance. By implementing the virtual machine instances in collocated locations, data privacy and security may be increased for the execution of multiple tasks. Further, the speed and efficiency of the chained execution of tasks is improved by executing tasks in collocated environments as the subsequent virtual machine instance may be located on the same rack, region, etc. Therefore, the function orchestrator may enable chained tasks to be executed on collocated virtual machine instances.

The function orchestrator of the on-demand code execution system may receive a set of tasks for a set of code for execution. The function orchestrator of the on-demand code execution system may identify virtual machine instances for execution of each task of the plurality of tasks. The function orchestrator may identify the virtual machine instances for execution of the plurality of tasks iteratively as results are received or in response to receiving a set of code. Further, the function orchestrator may provide a task for execution on the virtual machine instance and may identify how the virtual machine instance is to obtain the results of the execution of a previous task. The identification of how the virtual machine instance is to obtain the results may include identification of the prior virtual machine instance and/or identification of the subsequent virtual machine instance. By identifying the prior virtual machine instance and/or the subsequent virtual machine instance, the function orchestrator may enable the subsequent virtual machine instance to obtain the results directly from the prior virtual machine instance. For example, the prior virtual machine instance may push the results directly to the subsequent virtual machine instance based on the function orchestrator identifying the subsequent virtual machine instance and/or the subsequent virtual machine instance may pull the results directly from the prior virtual machine instance based on the function orchestrator identifying the prior virtual machine instance. Therefore, the function orchestrator can enable the direct pushing and/or pulling of results of the execution of a particular task by virtual machine instances without the function orchestrator receiving the results.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

As will be appreciated by one of skill in the art in light of the present disclosure, the embodiments disclosed herein improve the ability of computing systems, such as on-demand code execution systems, to execute chained tasks for a set of code. Moreover, the presently disclosed embodiments address technical problems inherent within computing systems; specifically, the difficulties of executing a chained plurality of tasks for a set of code. These technical problems are addressed by the various technical solutions described herein, including storing status information of the execution of particular tasks and passing and/or pulling results of the execution of tasks directly between virtual machine instances. By passing and/or pulling results of the execution of tasks directly between virtual machine instances, the virtual machine instances can transfer data in a peer to peer manner. Thus, the present disclosure represents an improvement on existing data processing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with a serverless code execution system 110 via a network 104. By way of illustration, various example client devices 102 are shown in communication with the serverless code execution system 110 (the on-demand code execution system), including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the user computing devices 102 with one or more user interfaces, command-line interfaces (CLI), application programing interfaces (API), and/or other programmatic interfaces for generating and uploading user-executable source code (e.g., as part of a disk image or in association with a data set depended on by the code), invoking the user-provided source code (e.g., submitting a request to execute the source code on the serverless code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution system 110 to implement desired functionality on behalf of a user. Auxiliary services 106 can correspond to network-connected computing devices, such as servers, which generate data accessible to the serverless code execution system 110 or otherwise communicate to the serverless code execution system 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 1 as distinct from the user computing devices 102 and the serverless code execution system 110, in some embodiments, various auxiliary services 106 may be implemented by either the user computing devices 102 or the serverless code execution system 110.

The client devices 102, auxiliary services 106, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 is depicted in FIG. 1 as operating in a distributed computing environment including several computer systems that are interconnected using one or more computer networks (not shown in FIG. 1). The serverless code execution system 110 could also operate within a computing environment having a fewer or greater number of devices than are illustrated in FIG. 1. Thus, the depiction of the serverless code execution system 110 in FIG. 1 should be taken as illustrative and not limiting to the present disclosure. For example, the serverless code execution system 110 or various constituents thereof could implement various Web services components, hosted, or "cloud" computing environments, and/or peer to peer network configurations to implement at least a portion of the processes described herein.

Further, the serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 is illustrated as connected to the network 104. In some embodiments, any of the components within the serverless code execution system 110 can communicate with other components of the serverless code execution system 110 via the network 104. In other embodiments, not all components of the serverless code execution system 110 are capable of communicating with other components of the environment 100. In one example, only the frontends 120 may be connected to the network 104, and other components of the serverless code execution system 110 may communicate with other components of the environment 100 via the frontends 120.

In FIG. 1, users, by way of user computing devices 102, may interact with the serverless code execution system 110 to provide source code, and establish rules or logic defining when and how such code should be executed on the serverless code execution system 110, thus establishing a "task." For example, a user may wish to run a set or piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc.) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communicate user-specified code and associated data sets to the on-demand code execution system 110 (e.g., in the form of a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute the task (e.g., a "task call," a "function call." etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a task, an end user may define subject code for the task and associated data to be used to execute the task. In one embodiment, the code is provided in the form of a disk image containing the code and other data that the code may use during execution. The disk image and associated metadata for the task (e.g., the end user who "owns" the task or other information regarding the task) may be stored within an object storage system. The object storage system may represent any of a number of object storage systems, such as AMAZON™'s SIMPLE STORAGE SERVICE™ (or "S3™"). In accordance with embodiments of the present disclosure, a disk image may further be divided into a number of portions, each stored as a separate object on the object storage system.

After a user has created a task on the serverless code execution system 110, the system 110 may accept calls to execute that task. To accept calls to execute a task, the frontend 120 can include an execution queue, which can maintain a record of requested task executions. Illustratively, the number of simultaneous task executions by the serverless code execution system 110 is limited, and as such, new task executions initiated at the serverless code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the serverless code execution system 110 may limit the rate of task executions on the serverless code execution system 110 (e.g., for cost reasons). Thus, the serverless code execution system 110 may utilize an account-specific execution queue to throttle the rate of simultaneous task executions by a specific user account. In some instances, the serverless code execution system 110 may prioritize task executions, such that task executions of specific accounts or of specified priorities bypass or are prioritized within the execution queue. In other instances, the serverless code execution system 110 may execute tasks immediately or substantially immediately after receiving a call for that task, and thus, the execution queue may be omitted.

As noted above, tasks may be triggered for execution at the serverless code execution system 110 based on explicit calls from user computing devices 102 (e.g., as received at a request interface). Alternatively or additionally, tasks may be triggered for execution at the serverless code execution system 110 based on data retrieved from one or more auxiliary services 106. To facilitate interaction with auxiliary services 106, the frontend 120 can include a polling interface, which operates to poll auxiliary services 106 for data. Illustratively, the polling interface may periodically transmit a request to one or more user-specified auxiliary services 106 to retrieve any newly available data (e.g., social network "posts," news articles, files, records, etc.), and to determine whether that data corresponds to user-established criteria triggering execution a task on the serverless code execution system 110. Illustratively, criteria for execution of a task may include, but is not limited to, whether new data is available at the auxiliary services 106, the type or content of the data, or timing information corresponding to the data. In some instances, the auxiliary services 106 may function to notify the frontend 120 of the availability of new data, and thus the polling service may be unnecessary with respect to such services.

In addition to tasks executed based on explicit user calls and data from auxiliary services 106, the serverless code execution system 110 may in some instances operate to trigger execution of tasks independently. For example, the serverless code execution system 110 may operate (based on instructions from a user) to trigger execution of a task at each of a number of specified time intervals (e.g., every 10 minutes).

The frontend 120 can further includes an output interface configured to output information regarding the execution of tasks on the serverless code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183A, . . . , 183N. As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well. Execution environments may alternatively include software containers, sometimes referred to as "OS-level virtualization," another virtualization technology known in the art. Thus, where references are made herein to VM instances 183A, . . . , 183N, it should be understood that (unless indication is made to the contrary) a container may be substituted for such instances 183A, . . . , 183N.

Each worker 181 may host a number of instances 183A, . . . , 183N. Each of the instances 183A, . . . , 183N may be isolated from other instances 183A, . . . , 183N, thus ensuring the security of code executions on the serverless code execution system 110. For example, each of the instances 183A . . . , 183N may be divided by a virtualization boundary, by virtue of the instances 183A, . . . , 183N being a virtual machine hosted by the worker 181. In addition, each of the instances 183A, . . . , 183N may exist within a partitioned user space on the worker 181, which logically partitions resources of the worker 181 among the instances 183A, . . . , 183N. Each user space may, for example, represent a "chroot" jail—a known isolation technique for LINUX™ operating systems. Each virtual machine instance may be instantiated with one or more virtualized physical components that are supported by physical components of the host device (e.g., memory, disks, GPUs, etc.). For example, the VM instance 183A may be instantiated with particular virtualized physical components. Each of the instances 183A, . . . , 183N may be dynamically spun up or down based on requests for execution of tasks for a set of code (e.g., provisioned or released). In some embodiments, each of the instances 183A, . . . , 183N hosted by a particular worker 181 may be collocated in a particular area or location. The physical components of the host device supporting particular instances may be located in a particular region of the world (e.g., a southeastern United States region, a northeastern United States region, etc.), a particular data center (e.g., a data center at a particular location supporting at least one host device), a particular rack (e.g., a particular rack of a plurality of racks for host devices at a data center), a particular network host (e.g., a particular host device), etc. For example, a particular instance may be associated with a northeastern United States region, data center #10412 in the northeastern United States region, rack #1212 in the data center #10412, and network host #2 on the rack #1212. It will be understood that location of each instance may be identified with any level of granularity. For example, the location of the instances may be based on the regions of each instance or the network hosts of each instance. Further, it will be understood that the location of each instance may be identified using more, less, or different location identifiers (e.g., country, region, geographical location, group of data centers, data center, rack, network host, etc.). In other embodiments, at least one of the instances 183A, . . . , 183N may not be collocated within the same area or location.

To facilitate rapid execution of code, each worker 181 may be configured to maintain a set of instances 183A, . . . , 183N in a "pre-warmed" state, being at least partially configured to begin execution of code. For example, instances may be created on the worker and configured with access to virtualized physical components. In accordance with embodiments of the present disclosure, it may be impractical or impossible to maintain instances 183A, . . . , 183N in a fully warmed state for all possible code executions, as executions may be associated with a wide variety of at least partially distinct data sets (e.g., disk images and/or snapshots). Thus, instances 183A, . . . , 183N may be maintained in a "greatest commonality" for a given group of tasks, such as being provisioned with a set of computing resources common to those tasks, being configured to accept an operating system type used by those tasks, etc.

On receiving instructions to provision an instance 183A to support execution of the task, the worker 181 may adjust the configuration of the instance 183A to support that execution. Specifically, and in accordance with embodiments disclosed herein, the worker 181 may provision the instance 183A with access to a disk image or snapshot corresponding to the task, in a manner that does not require that disk image or snapshot to be fully transferred to local storage of the worker 181 prior to use. Rather, the worker 181 may provide to an instance 183A what appears to be full local access to the disk image or snapshot, while "lazily" retrieving portions of that image or snapshot in response to a request to read such portions.

The serverless code execution system 110 may route tasks to instances 183A, . . . , 183N based on information provided by the function orchestrator system 130. The function orchestrator system 130 may orchestrate the chained execution of a plurality of tasks for a set of code. The function orchestrator system 130 may include a function orchestrator 136 that may identify location information for instances 183A, . . . , 183N. In some embodiments, the function orchestrator system 130 may be a separate system from the serverless code execution system 110. For example, the function orchestrator system 130 may be a system separate and remote from the serverless code execution system 110 that provides information to the serverless code execution system 110 to instruct the serverless code execution system 110 how to route tasks to instances 183A, . . . , 183N. In other embodiments, the function orchestrator system 130 may be a component of the serverless code execution system 110. The function orchestrator system 130 may store location information for each of the instances 183A, . . . , 183N. Based on the location information for each of the instances 183A, . . . , 183N, the function orchestrator 136 may identify instances that are collocated. For example, the function orchestrator 136 may identify instances 183A, . . . , 183N that are collocated within a particular radius of the location of another instance. Further, the function orchestrator 136 may identify a first subset of the instances 183A, . . . , 183N that are collocated within a first radius of the location of an instance, a second subset of the instances 183A, 183N that are collocated within a second radius of the location of the instance, etc. Therefore, the function orchestrator 136 may dynamically assign tasks to instances to generate destination identifiers that identify instances for the execution of each task.

In order to dynamically assign tasks to instances, the function orchestrator 136 may receive a request to implement an instance for a subsequent task. Additionally, the function orchestrator 136 may also receive identification of a prior virtual machine instance for execution of a prior task. Further, the function orchestrator 136 may also receive a collocation request to identify a particular radius or area relative to the prior virtual machine instance. Based on the identification of the prior virtual machine instance and/or the collocation request, the function orchestrator 136 may identify a virtual machine instance that satisfies the collocation request for execution of the task. The function orchestrator 136 may also determine that a virtual machine instance does not satisfy the collocation request and may spin up a virtual machine instance that satisfies the request. The function orchestrator 136 may identify the virtual machine instance to the serverless code execution system 110 and based on this identification, the serverless code execution system 110 can dynamically assign the task on the virtual machine instance.

As tasks are executed on instances 183A, . . . , 183N, the instances 183A, . . . 183N may identify that the particular task has been executed and route a status update to the function orchestrator 136 identifying that the task has been executed. The function orchestrator 136 may store the status update as a status 135A, . . . 135N in a status data store 134. In some embodiments, the function orchestrator 136 may store the results of the execution of the task in a results data store. In some embodiments, the instances 183A, . . . , 183N may not provide the results of the execution of the task in a results data store and may pass the results directly to a subsequent instance (e.g., from one instance to another instance in a peer to peer manner).

In some embodiments, the function orchestrator 136 may store one or more call graphs. The one or more call graphs may identify one or more steps for the implementation of a chained execution of tasks. For example, the one or more call graphs may identify how to execute each task.

Further, the function orchestrator system 130 may interact with the workers 181 for facilitating the distribution of tasks to the instances 183A, . . . , 183N. The workers 181 may receive a task for execution and pass instructions to execute the task to a particular instance. Further, the workers 181 may communicate with the instance to pass a status of the execution of the task to the function orchestrator 136. In some embodiments, the workers 181 may pass the results of the execution of the task to a subsequent virtual machine instance or to store the results of the execution in the results data store. Any of the workers or the instances 183A, . . . , 183N may communicate in a peer to peer manner and may not pass results of the execution of task to the function orchestrator 130. In some embodiments, the workers 181 may communicate results of the execution of a particular task in a peer to peer manner. For example, a first worker can pass results of the execution of a particular task directly to a second worker. In other embodiments, the instances 183A, . . . , 183N may communicate results of the execution of a particular task in a peer to peer manner. For example, a first instance can pass results of the execution of a particular task directly to a second worker. In other embodiments, a worker or an instance can communicate results of the execution of a task to a data store for access by a subsequent worker or a subsequent instance in a peer to peer manner. In other embodiments, a worker can communicate results of the execution of a task directly to a instance in a peer to peer manner and/or an instance can communicate results of the execution of a task directly to a worker in a peer to peer manner.

In addition, the system 110 includes a number of components for facilitating distribution of calls to execute a task from frontends 120 to particular VM instances 183A, . . . , 183N. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices-illustratively "lease" particular VM instances 183A, . . . , 183N within the worker fleet 180, thus gaining operational control to, for example, instruct virtual machine instances 183A, . . . , 183N to execute code of the task. Thus, on receiving a call to execute a task, a frontend 120 may distribute the call to a worker manager 140, which may identify a currently-leased VM instance 183A in which to implement the task, and cause the instance 183A to implement the task. Example interactions for distributing a call from a frontend 120 to a worker manager 140 are described, for example, in U.S. patent application Ser. No. 16/698,829, entitled "SERVERLESS CALL DISTRIBUTION TO UTILIZE RESERVED CAPACITY WITHOUT INHIBITING SCALING" and filed Nov. 27, 2019, the entirety of which is hereby incorporated by reference.

Figure 2:
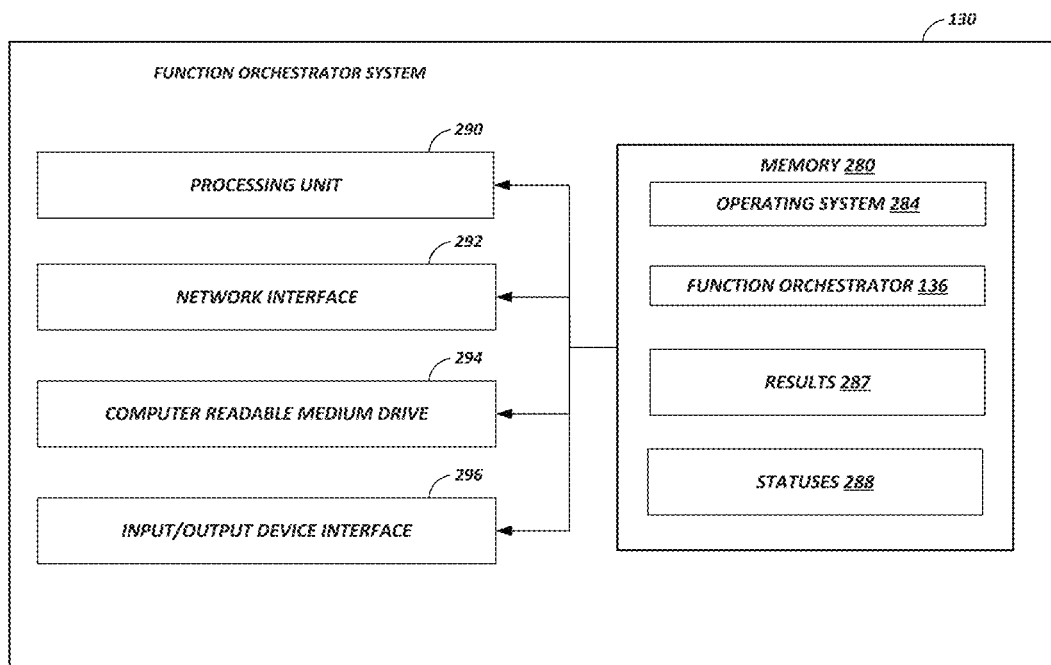
FIG. 2 depicts a general architecture of a computing device providing a function orchestrator system that is configured to orchestrate the execution of tasks for a set of code in the on-demand code execution system of FIG. 1.

FIG. 2 depicts a general architecture of a computing system (referenced as function orchestrator system 130) that operates to orchestrate the execution of multiple tasks for a set of code within the serverless code execution system 110. The general architecture of the function orchestrator system 130 depicted in FIG. 2 includes an arrangement of computer hardware and software modules that may be used to implement aspects of the present disclosure. The hardware modules may be implemented with physical electronic devices. The function orchestrator system 130 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the device 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 2 as a single set of memory 280, memory 280 may in practice be divided into tiers, such as primary memory and secondary memory, which tiers may include (but are not limited to) RAM, 3D XPOINT memory, flash memory, magnetic storage, and the like. For example, primary memory may be assumed for the purposes of description to represent a main working memory of the device 200, with a higher speed but lower total capacity than a secondary memory, tertiary memory, etc.

The memory 280 may store an operating system 284 that provides computer program instructions for use by the processing unit 290 in the general administration and operation of the device 200. The memory 280 may further include computer program instructions and other information for implementing aspects of the present disclosure. For example, in one embodiment, the memory 280 includes a function orchestrator 136 to orchestrate the execution of tasks as described above. The memory 280 also includes the call graph 287 of the tasks using the virtual machine instances. In some embodiments, the memory 280 includes the statuses 288 of the execution of tasks. The statuses 288 may be cached locally to the function orchestrator system 130, such as in the form of a memory mapped file.

The function orchestrator system 130 of FIG. 2 is one illustrative configuration of such a device, of which others are possible. For example, while shown as a single device, a function orchestrator system 130 may in some embodiments be implemented as a logical device hosted by multiple physical host devices. In other embodiments, the function orchestrator system 130 may be implemented as one or more virtual devices executing on a physical computing device. While described in FIG. 2 as a function orchestrator system 130, similar components may be utilized in some embodiments to implement other devices shown in the environment 100 of FIG. 1.

Figure 3:
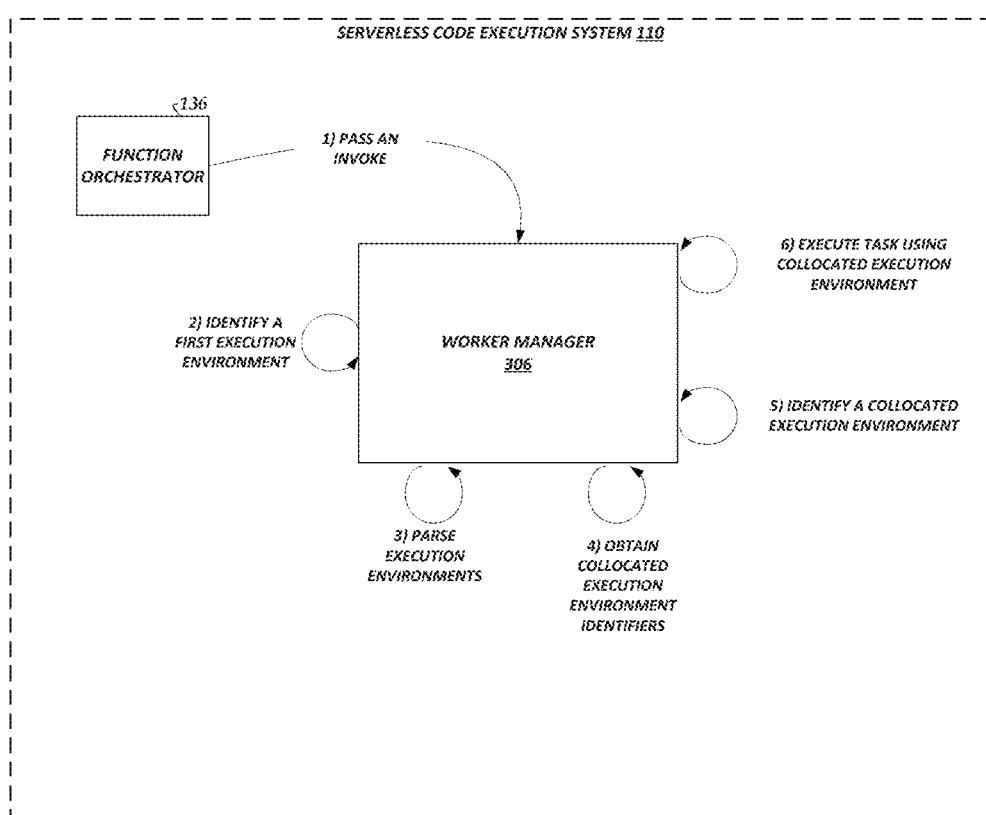
FIG. 3 is a flow diagram depicting illustrative interactions for identifying collocated execution environments.

To further illustrate how collocated execution environments (e.g., deployment environments) may be selected from a plurality of execution environments for execution of a plurality of tasks for a set of code, FIG. 3 depicts illustrative interactions for identifying collocated execution environments using the serverless code execution system 110, including identifying an execution environment and parsing execution environments to identify execution environments collocated to the execution environment. The interactions of FIG. 3 may occur, for example, after calls to execute tasks have been provided to the serverless code execution system 110 for execution and after the execution of one or more related tasks. Further, the interactions may begin prior to the execution of related tasks.

The interactions of FIG. 3 begin at (1), where the function orchestrator 136 passes an invoke (e.g., for the execution of a task) to a worker manager 306. The function orchestrator 136 may pass the invoke to the worker manager 306 based on determining that the worker manager 306 is assigned to the task. Further, the function orchestrator 136 may pass the invoke with an identifier of a first worker (e.g., a previous worker) and/or a first execution environment (e.g., a previous worker assigned to a prior task).

To identify a location of the previous worker and/or execution environment, at (2), the worker manager 306 identifies the first execution environment and/or the first worker based on the identifier. For example, the worker manager 306 may identify a first task (e.g., a related task, an initial task, etc.) of a plurality of chained tasks is associated with the first execution environment and may identify the first execution environment based on the identifier. In some embodiments, the worker manager 306 may identify the first execution environment based on determining that the first task is scheduled to be executed using the first execution environment (e.g., the first task has been mapped to the first execution environment by the serverless code execution system 110 but has not been executed). Based on identifying the first execution environment, the worker manager 306 may also identify location information of the first execution environment. For example, the worker manager 306 may identify one or more of a rack, a region, a geographic location, a data center, etc. of the first execution environment. The worker manager 306 may also identify a collocation request associated with the first task.

In some embodiments, the function orchestrator 136 may pass the invoke with an identifier of multiple workers and/or multiple execution environments. For example, a first execution environment may pass results of the execution of a first task to a second execution environment and a third execution environment and the second execution environment may pass results of the execution of a second task to the third execution environment. Further, the function orchestrator 136 may pass the invoke to the worker manager 306 with an identifier of the first execution environment and the third execution environment. Therefore, the worker manager 306 may identify execution environments collocated to the first execution environment and the second execution environment.

To identify execution environments collocated to the first execution environment, at (3), the worker manager 306 parses execution environments. For example, the worker manager 306 may parse the execution environments to identify an execution environment collocated as close as possible (e.g., the same rack) to the first execution environment based on identifying the first execution environment. In some embodiments, the worker manager 306 may identify execution environments collocated within a particular network distance of the first execution environment. Further, the worker manager 306 may obtain information identifying the particular area or network distance relative to the first execution environment from the function orchestrator 136.

To identify collocated execution environments of the execution environments, the worker manager 306, at (4), obtains collocated execution environment identifiers. The collocated execution environment identifiers may identify execution environments of the execution environments that are collocated within a particular area relative to the first execution environment based on the collocation request. The worker manager 306 may periodically or incrementally obtain the collocated execution environment identifiers from the worker fleet 180. Further, the worker manager 306 may periodically or incrementally obtain the collocated execution environment identifiers as tasks are executed using the execution environments. For example, the worker manager 306 may periodically obtain the collocated execution environment identifiers from the worker fleet 180 based on identifying a task has been executed using an execution environment (e.g., based on a status of the task). Further, the worker manager 306 may obtain the collocated execution environment identifiers from the worker fleet 180 based on receiving a request to implement a plurality of tasks for a set of code. In some embodiments, based on executing the first task, the worker manager 306 may obtain the collocated execution environment identifiers from the worker fleet 180 prior to the release of the first execution environment. After the collocated execution environment identifiers are obtained, the first execution environment may be released. In some embodiments, the first execution environment may not be released.

In some embodiments, the worker manager 306 may determine that no execution environments or an insufficient number of execution environments are collocated to the first execution environment. Based on this determination, the worker manager 306 may spin up a new execution environment such that it is located as close as possible to the first execution environment and/or within a particular network distance of the first execution environment (e.g., the same rack). For example, the worker manager 306 may request the generation or spinning up of an execution environment that is collocated to the first execution environment (e.g., that satisfies the collocation request). In some embodiments, the worker manager 306 may request the generation of an execution environment by another service for spinning up execution environments. Further, the worker manager 306 may provide an identifier of prior execution environments to the other service to aid in spinning up the execution environment.

Based on the obtained collocated deployment identifiers, the worker manager 306, at (5), the worker manager 306 identifies a collocated execution environment. The worker manager 306 may identify the collocated execution environment from collocated execution environments identified by the collocated execution environment identifiers. Further, the worker manager 306 (or a separate load balancer) may perform load balancing to select a particular collocated execution environment from the collocated execution environments identified by the collocated execution environment identifiers (e.g., based on the workload, the status, etc. of the collocated execution environments). In some embodiments, where the worker manager 306 does not identify any collocated execution environments from the collocated execution environment identifiers (e.g., where the collocated execution environment identifiers do not identify any collocated execution environments), the worker manager 306 may identify the collocated execution environment by requesting the generation of a particular execution environment and receiving an identification of the generated execution environment.

To invoke the call, the worker manager 306, at (6), executes the task using the collocated execution environment. Therefore, the worker manager 306 may utilize the collocated execution environment for the execution of the task corresponding to the invocation of the call received by the worker manager 306 from the function orchestrator 136.

Figure 4A:
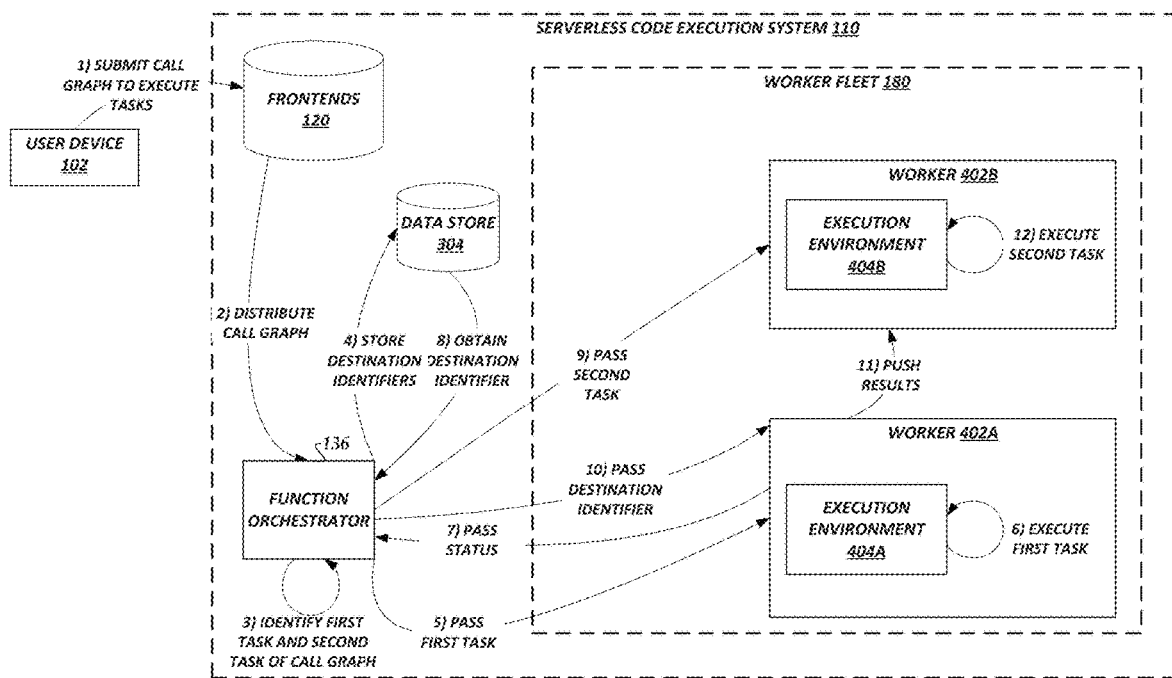
FIG. 4A is a flow diagram depicting illustrative interactions for the execution of multiple tasks and pushing the results of the execution of a first task for execution of a second task.

To further illustrate how the function orchestrator may use identified execution environments (e.g., identified collocated environments) for execution of a chained plurality of tasks for a set of code, FIG. 4A depicts illustrative interactions 400A for executing a plurality of tasks using execution environments of the serverless code execution system 110, including executing a task and pushing the results of the execution of the task from a first execution environment to a second execution environment. The interactions 400A of FIG. 4A may occur, for example, after calls to execute tasks have been provided to the serverless code execution system 110 for execution and after the execution of one or more related tasks. Further, the interactions may begin prior to the execution of related tasks.

The interactions of FIG. 4A begin at (1), where a user device 102 submits a call graph to execute a chain of tasks to the frontend 120 to execute the chain. The user device 102 may submit a set of code to the frontend 120 as a call graph to the frontend 120 to execute a chain. The user device 102 may edit the set of code and invoke the set of code via the serverless code execution system 110. The serverless code execution system 110 may be a bifurcated deployment system that provisions remote resources to invoke the set of code and releases the remote resources after invoking the set of code. The user device 102 may utilize an interface (e.g., a web browser, a notebook client interface) to define and invoke the set of code. While FIG. 4A depicts submission of a call graph and invocation of functions defined within the graph as a single operation, these operations may be distinct. For example, the user device 102 may submit a call graph and associate the call graph with one or more events as triggers for executing the call graph, thus beginning the interactions of FIG. 4A.

Submission of the set of code to the frontend 120 may include transmission of specialized data to the frontend 120, such as a HTTP packet or API call referencing the chain to execute the set of code. While the interactions of FIG. 3 are described as submitting an explicit request, by the user device 102, to execute the set of code, requests to execute the set of code may occur in a variety of manners, including submission of a call by auxiliary services 106 (not shown in FIG. 4A). The request may include any information required to execute the set of code, such as parameters for execution, authentication information under which to execute the set of code or to be used during execution of the set of code, etc.

To provide the set of code to a particular virtual machine instance for execution of the task (e.g., the function), the frontend 120, at (2), distributes the call graph to the function orchestrator 136. The frontend 120 may distribute the call graph to the function orchestrator 136 in order to chain multiple tasks into a chain or a call graph. Further, prior to distributing the call graph to the function orchestrator 136, the frontend 120 may verify that the call graph references multiple tasks. In some embodiments, the frontend may distribute the call graph to the function orchestrator 136 in order for the function orchestrator 136 to determine whether the call graph is associated with multiple tasks.

Based on receiving the call graph from the frontend 120, the function orchestrator 136, at (3), identifies a first task and a second task of the call graph. It will be understood that the call graph may be associated with any number of tasks. Further, the function orchestrator 136 may identify a plurality of tasks of the call graph. In some embodiments, the function orchestrator 136 may parse the call graph to determine that the plurality of tasks are to be executed using different execution environments. Based on identifying the first task and the second task of the call graph and/or based on determining that the plurality of tasks are to be executed using different execution environments, the function orchestrator 136 may determine a chained execution for the first task and the second task. Further, the function orchestrator 136 may determine a destination (e.g., a worker and/or an execution environment) for each task. In some embodiments, as discussed above, the worker manager 306 may identify collocated destinations (e.g., collocated deployments) for the execution of each task. Based on determining the destinations for each task, the function orchestrator 136 may determine a destination identifier for each of the destinations and the tasks by dynamically assigning particular destinations to particular tasks.

Based on determining a chained execution for the first task and the second task, the function orchestrator 136, at (4), stores the destination identifiers in a data store 304. The function orchestrator 136 may store each destination identifier and each destination identifier may identify a task assigned to the associated destination. For example, the function orchestrator 136 may store the first task in association with a first destination identifier (e.g., identifying a first execution environment) and the second task in association with a second destination identifier. It will be understood that the function orchestrator 136 may store a destination identifier for each task. In some embodiments, the function orchestrator 136 may assign the same destination identifier to multiple tasks.

In order to distribute the first task to the assigned execution environment, the function orchestrator 136, at (5), passes the first task for the set of code to a worker 402A. The function orchestrator 136 may provide the destination identifier for the first task to the worker 402A. In some embodiments, the function orchestrator 136 may provide the destination identifier for the currently implemented task (e.g., the first task) and the destination identifier for a subsequent task (e.g., the second task). Various additional functionalities that may be implemented by a function orchestrator 136 to distribute call graphs to a worker 402A are described, for example, in U.S. patent application Ser. No. 16/698,829, entitled "SERVERLESS CALL DISTRIBUTION TO UTILIZE RESERVED CAPACITY WITHOUT INHIBITING SCALING," which is hereby incorporated by reference in its entirety. In order to pass the first task to the worker 402A, the function orchestrator may pass the first task to a worker manager, such as worker manager 306. The worker manager may receive the first task, select the worker 402A based on the call, spins up worker 402A if required, and passes the first task to the worker 402A. Further, the worker manager may identify the appropriate execution environment 404A (e.g., a virtual execution environment such as VM instance 183A or a physical execution environment including one or more physically separated resources) based on the destination identifier. The worker manager may further determine that the execution environment 404A already exists, and may thus execute the first task within the execution environment 404A. In some embodiments, the worker manager may determine that generation or spinning up the execution environment 404A is required to service the call graph. Therefore, the worker manager may determine the resources that will be allocated to execute the first task. The worker manager may allocate the resources for the execution environment 404A to execute the first task. Therefore, the function orchestrator 136 can pass the first task to the worker 402A.

In order to distribute the first task to a particular execution environment 404A, the worker 402A, distributes instructions to execute the first task to an execution environment 404A. The worker 402A may distribute the instructions to the execution environment 404A based on the destination identifier for the first task passed to the worker 402A by the function orchestrator 136. Therefore, the worker 402A may execute the first task in the execution environment 404A.

Based on the instructions to execute the first ask, the worker 402A, at (6) executes the first task using the execution environment 404A. The worker 402A can execute the first task for the set of code in the allocated execution environment 404A. After executing the first task for the set of code, the worker 402A may deallocate (e.g., release) the resources for the execution environment 404A. Therefore, the worker 402A executes the first task using an allocated execution environment 404A.

To capture the results of the execution of the first task and for execution of a second task, the worker 402A obtains the results of the execution of the first task. The worker 402A may obtain the results of the execution of the first task based on the execution of the first task. In some embodiments, the worker 402A may obtain the results of the execution of the first task in a piecemeal manner as the first task is executed. For example, the worker 402 may obtain partial results of the execution of the first task as the first task is executed. Further, the task might write results to a defined portion of memory on the worker 402A or write the results and provide a reference to the location of the corresponding memory to the worker 402A in reporting the results.

Based upon obtaining the results of the execution of the first task, the worker 402A, at (7), passes a status to the function orchestrator 136. The worker 402A may pass a status identifying the status of the execution of the first task. For example, the worker 402A may provide an indication that the first task was executed. The worker 402A may provide the status for the execution of the first task to the function orchestrator 136 based upon receiving the first task from the function orchestrator 136. The worker 402A may identify the first task for the function orchestrator 136 by also providing the destination identifier for the first task to the function orchestrator 136.

In order to determine how to route the second task, the function orchestrator 136, at (8), obtains the destination identifier from the data store 304. The function orchestrator 136 may receive the status from the worker 402A and parse the status to identify the destination identifier for the first task. Further, the function orchestrator 136 may parse the data store 304 for a destination identifier associated with the destination identifier of the first task. Based upon storing the destination identifiers for each task, the function orchestrator 136 may identify the destination identifier for the second task. Therefore, the function orchestrator 136 may obtain the destination identifier for the second task based on the destination identifier for the first task.

In order to distribute the second task to the assigned execution environment, the function orchestrator 136, at (9), passes the second task for the set of code to a worker 402B. The function orchestrator 136 may provide the destination identifier the second task to the worker 402B. In some embodiments, the function orchestrator 136 may provide the destination identifier for the currently implemented task (e.g., the second task) and the destination identifier for a subsequent task (e.g., a third task). Further, the function orchestrator 136 may provide a destination identifier for a previously implemented task, a destination identifier for a currently implemented task, and/or a destination for the subsequent task to the worker 402B. The function orchestrator 136 may pass the second task to the worker 402B based on the destination identifier for the second task. It will be understood that the worker 402A and the worker 402B may be the same or a different worker. Therefore, the function orchestrator 136 can pass the second task to the worker 402B.

Based on obtaining the destination identifier, the function orchestrator 136, at (10), passes the destination identifier to the worker 402A. The function orchestrator 136 may provide the destination identifier for the second task to the worker 402A. In some embodiments, the function orchestrator 136 may pass the destination identifier for the first task to the worker 402A. Further, the function orchestrator 136 may pass the destination identifier to the worker 402A before or after passing or with the first task. Therefore, the function orchestrator 136 may pass the destination identifier to the worker 402A.

In order to provide the results of the execution of the first task to a second execution environment for execution of the second task, the worker 402A, at (11), pushes the results of the execution of the first task to the worker 402B based on the first task provided to the worker 402A. The worker 402A may push the results to the worker 402B based on the destination identifier for the second task. In some embodiments, the worker 402A may push the results indirectly to a data store of the worker 402B based on the destination identifier for the second task (e.g., with the destination identifier). Therefore, the worker 402A can push the results directly to the worker 402B or indirectly to the worker 402B via a results data store. By pushing the results in this manner, peer to peer data transfer is enabled between the workers.

The worker 402B may obtain the results of the execution of the first task directly from the worker 402A. The worker 402B may obtain the results of the execution of the first task directly from the worker 402A (e.g., as a push from the worker 402A). In some embodiments, the worker 402B may request and obtain the results of the execution of the first task from a results data store. The worker 402B may request and obtain the results based on a destination identifier for the first task. Therefore, the worker 402B can obtain the results of the execution of the first task.

Based on the obtained results for the execution of the first task, the worker 402B distributes instructions to execute the second task to an execution environment 404B of the worker 402B. The worker 402B may distribute the instructions to the execution environment 404B based on the destination identifier for the second task passed to the worker 402B by the function orchestrator 136. Therefore, the worker 402B may execute the second task in the execution environment 404B. It will be understood that the execution environment 404A and the execution environment 404 may be the same or different execution environments.

Based on receiving the instructions to execute the second task, the worker 402B, at (12), executes the second task using the execution environment 404B. The worker 402B can execute the second task for the set of code in the allocated execution environment 404B. After executing the second task for the set of code, the worker 402B may deallocate (e.g., release) the resources for the execution environment 404B. Therefore, the worker 402B executes the second task using an allocated execution environment 404B. In some embodiments, the set of code may be associated with additional tasks and the worker fleet 180 may pass the results of the execution of the second task to the worker 402 for use in the execution of subsequent tasks.

Figure 4B:
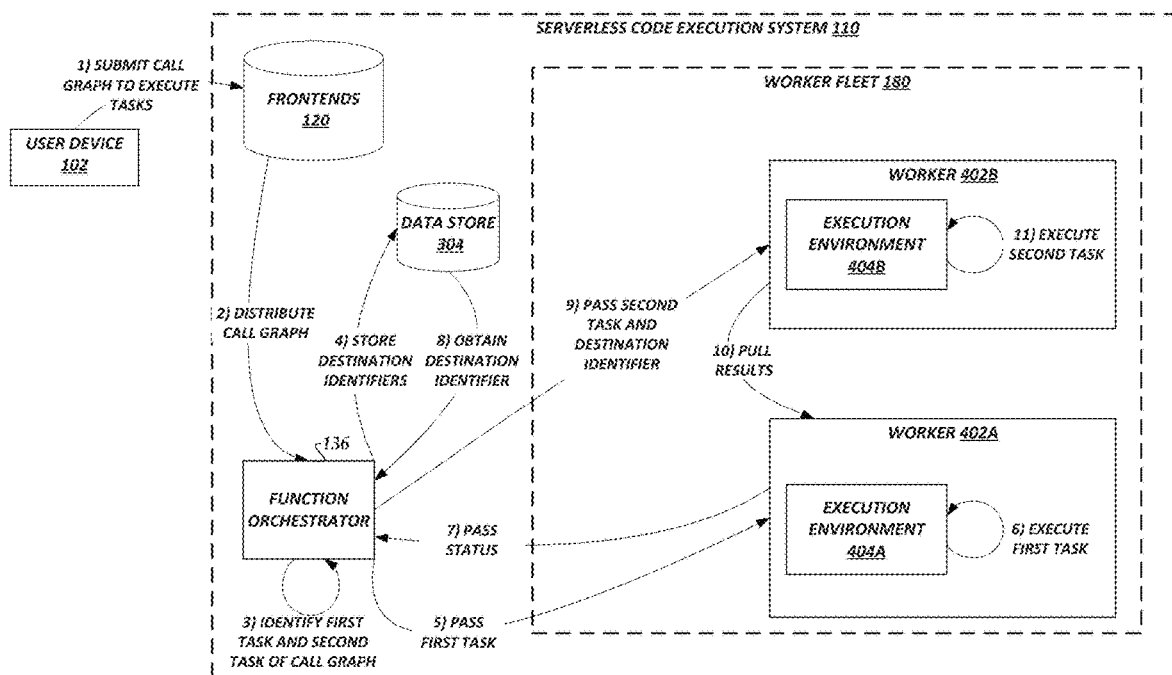
FIG. 4B is a flow diagram depicting illustrative interactions for the execution of multiple tasks and pulling the results of the execution of a first task for execution of a second task.

To further illustrate how the function orchestrator may use identified execution environments for execution of a chained plurality of tasks for a set of code, FIG. 4B depicts illustrative interactions 400B for executing a plurality of tasks using execution environments of the serverless code execution system 110, including pulling the results of the execution of a previous task from a first execution environment to a second execution environment. The interactions 400B of FIG. 4B may occur, for example, after calls to execute tasks have been provided to the serverless code execution system 110 for execution and after the execution of one or more related tasks. Further, the interactions may begin prior to the execution of related tasks.

The interactions of FIG. 4B begin at (1), where a user device 102 submits a call graph to execute a task to the frontend 120 to execute the task. (1)-(8) are similar to (1)-(8) of FIG. 4A as discussed above. The frontend 120 distributes the call graph to the function orchestrator 136. The frontend 120 may distribute the call graph to the function orchestrator 136 in order to determine the chained execution of multiple tasks. Based on receiving the call graph from the frontend 120, the function orchestrator 136 identifies a first task and a second task of the call graph. The function orchestrator 136 stores the destination identifiers in a data store 304. The function orchestrator 136 may store each destination identifier in association with a task assigned to the particular destination identifier. The function orchestrator 136 passes the first task for the set of code to a worker 402A. Further, the function orchestrator 136 may provide the destination identifier for the first task and the second task to the worker 402A. In order to distribute the first task to a particular execution environment 404A, the worker 402A distributes instructions to execute the first task to an execution environment 404A of the worker 402A. Based on receiving the instructions to execute the first task, the worker 402A executes the first task using the execution environment 404A and the worker 402A obtains the results of the execution of the first task. Based upon obtaining the results of the execution of the first task, the worker 402A passes a status to the function orchestrator 136 and in order to determine how to route the second task, the function orchestrator 136 obtains the destination identifier from the data store 304. The function orchestrator 136 may receive the status from the worker 402A and parse the status to identify the destination identifier for the first task to obtain the destination identifier for the second task from the data store 304.

In order to distribute the second task to the assigned execution environment, the function orchestrator 136, at (9), passes the second task for the set of code and the destination identifier for the first task to a worker 402B. The function orchestrator 136 may provide the destination identifier for the first task and the second task to the worker 402B. Based upon receiving the destination identifier for the first task, the worker 402B, at (10), pulls the results of the execution of the first task from the worker 402A. The worker 402B may pull the results directly from the worker 402A. In some embodiments, the worker 402B may pull the results from a data store associated with the worker 402A based on the destination identifier of the first task. Therefore, the worker 402B can pull the results directly from the worker 402A or indirectly from the worker 402A via a data store associated with the worker 402A. By pulling the results in this manner, peer to peer data transfer is enabled between the workers.

Based on the obtained results for the execution of the first task, the worker 402B distributes instructions to execute the second task to an execution environment 404B of the worker 402B and the worker 402B, at (11), executes the second task using the execution environment 404B.

Figure 5:
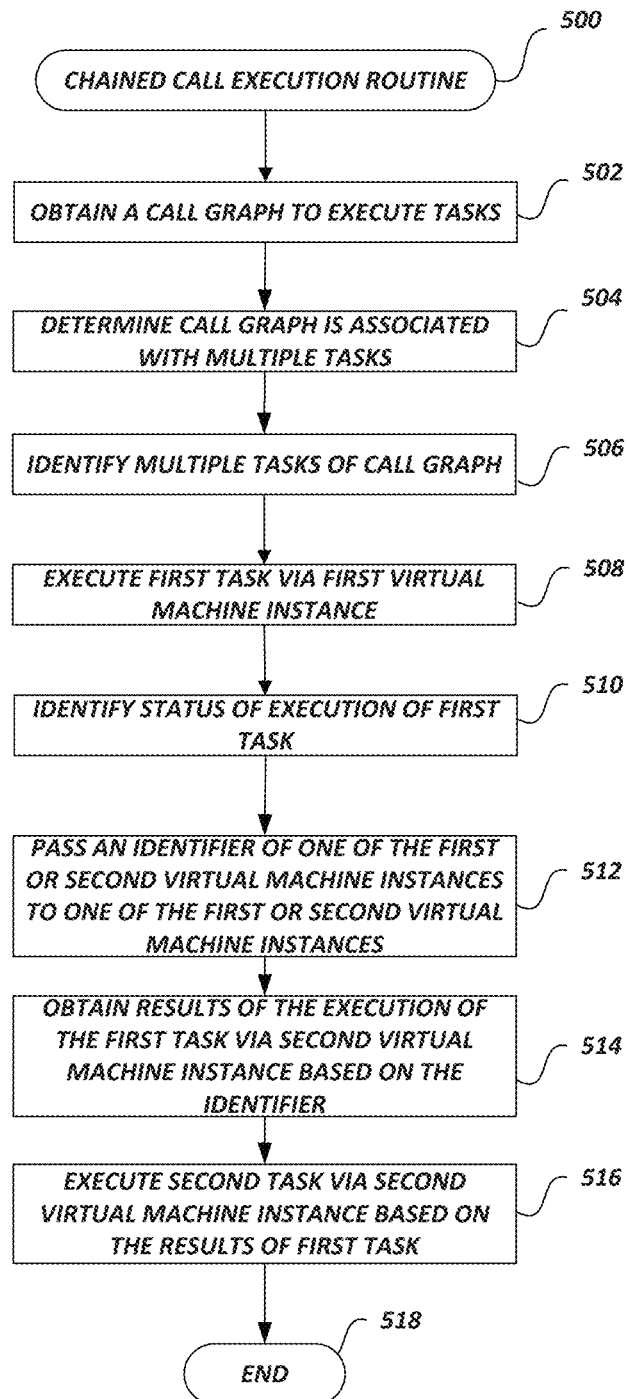
FIG. 5 is a flow chart depicting an illustrative routine executing chained tasks for a set of code.

With reference to FIG. 5, an illustrative routine 500 will be described for a chained execution of multiple tasks of a call graph. The routine 500 may be implemented for example, by the serverless code execution system 110 of FIG. 1. The routine 500 begins at block 502, the serverless code execution system in communication with a user device obtains a call graph to execute tasks. The serverless code execution system may obtain the call graph to execute the tasks as a set of code associated with multiple tasks.

In order to determine how to execute the call graph to execute the tasks, at decision block 504, the serverless code execution system determines the call graph (e.g., the set of code) is associated with multiple tasks. For example, the serverless code execution system may determine if the call graph references or includes multiple tasks for chained execution. Each of the tasks may be associated with a directed acyclic graph or a chain. Further, the serverless code execution system may obtain the tasks as a directed acyclic graph from a user computing device. The directed acyclic graph may identify each task and obtaining the call graph (e.g., the set of code) may be based on the directed acyclic graph.

Based on determining the call graph is associated with multiple tasks, at block 506, the serverless code execution system identifies the multiple tasks of the call graph. Based on identifying the multiple tasks of the call graph, the serverless code execution system may generate multiple virtual machine instances (e.g., a first virtual machine instance and a second virtual machine instance) for the tasks. For example, the serverless code execution system may generate a first virtual machine instance provisioned with a first on-demand code execution environment of a plurality of on-demand code execution environments for execution of the first task and a second virtual machine instance provisioned with a second on-demand code execution environment of the plurality of on-demand code execution environments for execution of the second task. Further, the serverless code execution system may dynamically assign each task to a respective virtual machine instance (e.g., based on collocated virtual machine instances, load balancing techniques, etc.). The serverless code execution system may store identifiers for each virtual machine instance. Each virtual machine instance may be hosted by a host device (e.g., a worker). In some embodiments, the virtual machine instances may be hosted by different host devices. In other embodiments, multiple virtual machine instances may be hosted by the same host device.

Based on identifying the multiple tasks, at block 508, the serverless code execution system executes a first task via a first virtual machine instance. In order to execute the first task, the serverless code execution system may initialize the first on-demand code execution environment on the first virtual machine instance for execution of the first task.

Execution of the first task may cause generation of results of the execution. In some embodiments, the first virtual machine instance may push the results to the second virtual machine instance or a data store associated with the second virtual machine instance. In other embodiments, the second virtual machine instance may pull the results from the first virtual machine instance or a data store associated with the first virtual machine instance. The serverless code execution system may provide an identifier of the second virtual machine instance to the first virtual machine instance and the first virtual machine instance may push the results to the second virtual machine instance using the identifier.

Based on the execution of the first task, at block 510, the serverless code execution system identifies the status of the execution of the first task (e.g., identifies the execution of the first task). Based on the status, the serverless code execution system may identify that the first task has been executed. Further, based on identifying the status of the execution of the first task, the serverless code execution system may obtain the identifier of the second virtual machine instance and initialize the second on-demand code execution environment based on obtaining the identifier of the second virtual machine instance.

In order to directly pass the results between virtual machine instances, at block 512, the serverless code execution system passes an identifier of one of the first or second virtual machines to one of the first or second virtual machine instances. For example, the serverless code execution system may provide an identifier of the first virtual machine instance to the second virtual machine instance and/or provide an identifier of the second virtual machine instance to the first virtual machine instance. The identifier may be an identifier of the first virtual machine instance (e.g., an explicit identifier) and/or the identifier may be an identifier of a data store storing the results of the execution of the first task (e.g., a predetermined identifier). For example, the serverless code execution system may pass an explicit identifier of the first virtual machine and/or the second virtual machine and/or may pass a predetermined identifier of a data store associated with the first virtual machine and/or the second virtual machine for storage of the results of the execution of the first task. In some embodiments, the serverless code execution system may pass multiple identifiers to the first virtual machine instance and/or the second virtual machine instance.

Based on the identifier, at block 514, the serverless code execution system obtains results of the execution of the first task via the second virtual machine instance. For example, the second virtual machine instance may pull the results from the first virtual machine instance (or a data store associated with the first virtual machine instance) using the identifier and/or the first virtual machine instance may push the results to the second virtual machine instance (or a data store associated with the second virtual machine instance) using the identifier. Further, the first virtual machine instance may push the results to multiple virtual machine instances (e.g., using multiple identifiers associated with multiple virtual machine instances) and/or the second virtual machine instance may pull the results from multiple virtual machine instances (e.g., using multiple identifiers associated with multiple machine instances). In some embodiments, the serverless code execution system may obtain streaming and/or batch results of the execution of the first task via the second virtual machine instance. For example, the serverless code execution system may generate streaming results by stream processing the first task via the first virtual machine instance and may obtain the streaming results for stream processing the second task via the second virtual machine instance. Further, the serverless code execution system may generate batch results by batch processing the first task via the first virtual machine instance.

In order for the chained execution of the multiple tasks, at block 516, the serverless code execution system executes a second task via the second virtual machine instance based on the results of the first task. Further, the serverless code execution system may execute the second task based on determining that the second task is associated with the first task. Further, the serverless code execution system may identify the second task as a task for performance on the results of the first task. Further, prior to executing the second task, the serverless code execution system may identify virtual machine instances collocated within a particular proximity to the first virtual machine instance and select the second virtual machine instance from the identified virtual machine instances. For example, the serverless code execution system may identify the location of the first virtual machine instance and select the second virtual machine instance from a plurality of virtual machine instances based on the location of the first virtual machine instance. In response to determining no virtual machine instances are collocated to the first virtual machine instance, the serverless code execution system may generate the second virtual machine instance provisioned with the second on-demand code execution environment based on identifying the execution of the first task. In order to execute the second task, the serverless code execution system may initialize the second on-demand code execution environment on the second virtual machine instance for execution of the second task. The second virtual machine instance may obtain the results from the first virtual machine instance and execution of the second task may cause one or more transformations to the results. The routine 500 then ends at block 518.

In various embodiments, the stateful execution routine 500 may include more, fewer, different, or different combinations of blocks than those depicted in FIG. 5. For example, the routine 500 may, in some embodiments, output an identifier identifying whether the call is associated with multiple tasks. As a further example, blocks 504 and 506 may be combined, and the routine 500 may identify the tasks without separately identifying the tasks of the call graph. The routine 500 depicted in FIG. 5 is thus understood to be illustrative and not limiting.

Figure 6:
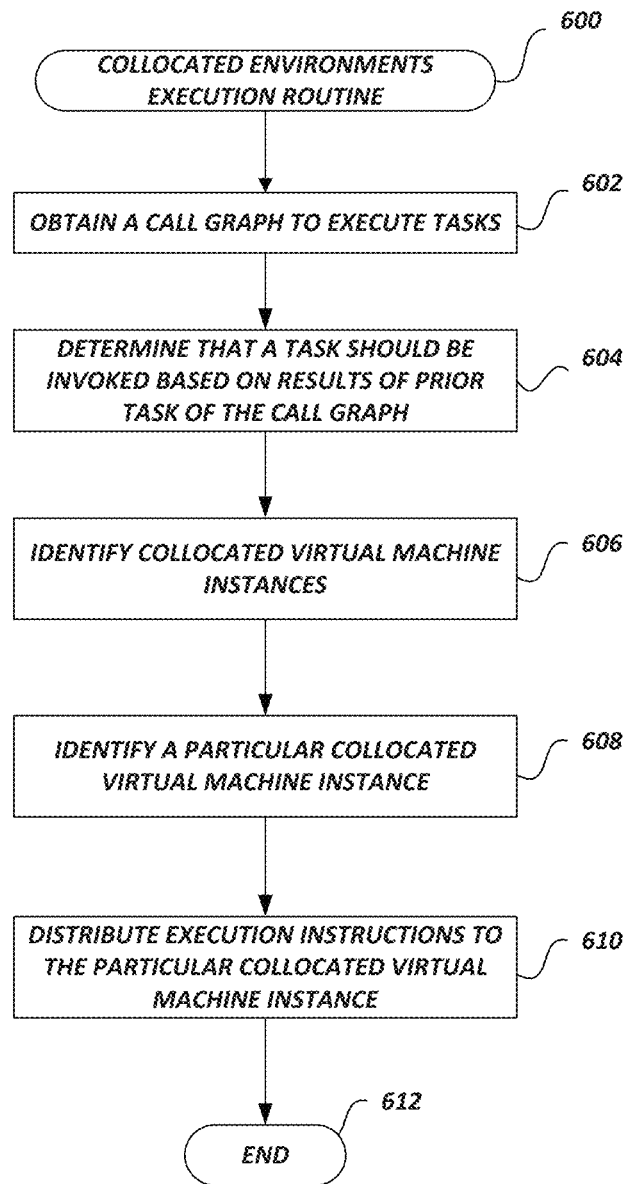
FIG. 6 is a flow chart depicting an illustrative routine executing tasks in collocated virtual machine instances for a set of code.

With reference to FIG. 6, an illustrative routine 600 will be described for an execution of a task using a virtual machine instance collocated to a virtual machine instance for execution of a prior task (or a worker collocated to a worker for execution of a prior task). The routine 600 may be implemented for example, by the serverless code execution system 110 of FIG. 1. The routine 600 begins at block 602, the serverless code execution system in communication with a user device obtains a call graph to execute tasks. For example, the serverless code execution system may obtain the call graph as a set of code for execution in a plurality of on-demand code execution environments.

In order to determine how to execute the call graph to execute the task, at decision block 604, the serverless code execution system determines that a task of the call graph should be invoked based on results of a prior task. Based on this determination, the serverless code execution system may identify a location of a virtual machine instance associated with the prior task (e.g., a first task). For example, the serverless code execution system may identify a location of a virtual machine instance previously utilized to execute the prior task. Further, the location of the virtual machine instance may be a network host, a rack, a data center, a region, or any other location.

Based on determining that the task should be invoked based on the results of the prior task, at block 606, the serverless code execution system identifies collocated virtual machine instances (e.g., virtual machine instances collocated to the virtual machine instance). The serverless code execution system may identify a virtual machine instance that is located the closest to the prior virtual machine instance from a plurality of virtual machine instances. Further, the serverless code execution system may identify one or more virtual machine instances collocated to the virtual machine instance (e.g., within a certain proximity of the virtual machine instance) for execution of the associated task. Identifying the collocated virtual machine instances may further be based on a network distance (e.g., a location criteria). For example, the network distance may define a proximity (e.g., a range of proximity) between the virtual machine instance and other virtual machine instances for the virtual machine instances to be considered collocated (e.g., the virtual machine instances must be located on the same rack to be considered collocated).

In order to map the task to a particular collocated virtual machine instance based on the execution of the prior task, at block 608, the serverless code execution system may select a collocated virtual machine instance for execution of the task from the collocated virtual machine instances. In some embodiments, virtual machine instances may be collocated to multiple virtual machine instances. If the serverless code execution system is unable to identify a collocated virtual machine instance, the serverless code execution system may generate one or more virtual machine instances provisioned with respective on-demand code execution environments for execution of tasks within a particular network distance of the virtual machine instance.

Based on identifying the particular collocated virtual machine instance, at block 610, the serverless code execution system distributes execution instructions to the particular collocated virtual machine instance. The routine 600 then ends at block 614.

In various embodiments, the stateful execution routine 600 may include more, fewer, different, or different combinations of blocks than those depicted in FIG. 6. For example, the routine 600 may, in some embodiments, output an identifier identifying whether the call graph is associated with multiple tasks. The routine 600 depicted in FIG. 6 is thus understood to be illustrative and not limiting.

Various example embodiments of the disclosure can be described by the following clauses:

Clause 1: A system comprising:
 a non-transitory data store configured to store computer-executable instructions; and
 a computing device in communication with the non-transitory data store, wherein the computer-executable instructions, when executed by the computing device, configure the computing device to:
  obtain a set of code for execution in a plurality of on-demand code execution environments;
  determine that the set of code is associated with a first task and a second task;
  cause a first virtual machine instance to be provisioned with a first on-demand code execution environment of the plurality of on-demand code execution environments for execution of the first task, wherein the first virtual machine instance is hosted by a first host device;
  cause the first on-demand code execution environment to be initialized on the first virtual machine instance for execution of the first task, wherein the execution of the first task causes generation of results;
  determine that the first task is associated with the second task via the set of code, wherein the second task comprises a task for performance on the results of the first task;
  cause a second virtual machine instance to be provisioned with a second on-demand code execution environment of the plurality of on-demand code execution environments, wherein the second virtual machine instance is hosted by a second host device;
  cause the second on-demand code execution environment to be initialized on the second virtual machine instance for execution of the second task based on the results; and
  communicate an identifier of the first host device to the second host device or an identifier of the second host device to the first host device, wherein the second on-demand code execution environment obtains the results from the first on-demand code execution environment based on the identifier of the first host device or the identifier of the second host device, wherein execution of the second task causes one or more transformations to the results.

Clause 2: The system of Clause 1, wherein the computer-executable instructions, when executed by the computing device, further configure the computing device to:
 store the identifier of the first host device and the identifier of the second host device; and
 obtain the identifier of the second host device, wherein causing the second on-demand code execution environment to be initialized is based on obtaining the identifier of the second host device.

Clause 3: The system of Clause 1 or Clause 2, wherein: the first host device pushes the results to the second host device; or the second host device pulls the results from the first host device.

Clause 4: The system of any one of Clauses 1-3, wherein to communicate the identifier of the first host device to the second host device or the identifier of the second host device to the first host device, the computer-executable instructions, when executed by the computing device, further configure the computing device to:
 communicate an identifier of the first virtual machine instance to the second virtual machine instance or an identifier of the second virtual machine instance to the first virtual machine instance.

Clause 5: The system of any one of Clauses 1-4, wherein the first host device and the second host device are a same host device.

Clause 6: A computer-implemented method comprising:
 obtaining a set of code for execution in a plurality of on-demand code execution environments;
 determining that the set of code is associated with a plurality of tasks, wherein a first task of the plurality of tasks is associated with a first on-demand code execution environment of the plurality of on-demand code execution environments and a second task of the plurality of tasks is associated with a second on-demand code execution environment of the plurality of on-demand code execution environments;

generating a first virtual machine instance provisioned with the first on-demand code execution environment and a second virtual machine instance provisioned with the second on-demand code execution environment, wherein the first virtual machine instance is hosted by a first host device and the second virtual machine instance is hosted by a second host device;

initializing the first on-demand code execution environment on the first virtual machine instance for execution of the first task, wherein the execution of the first task causes generation of results;

identifying the execution of the first task;

initializing, based on identifying the execution of the first task, the second on-demand code execution environment on the second virtual machine instance for execution of the second task based on the results; and communicating an identifier of the first host device to the second host device or an identifier of the second host device to the first host device, wherein the second on-demand code execution environment obtains the results based on the identifier of the first host device or the identifier of the second host device.

Clause 7: The method of Clause 6, further comprising:
routing, by the first host device, the results to a data store; and
pulling, by the second host device, the results from the data store.

Clause 8: The method of Clause 6 or Clause 7, wherein the first host device pushes the results to the second host device.

Clause 9: The method of any one of Clauses 6-8, wherein generating the first virtual machine instance and the second virtual machine instance comprises collocating the first host device and the second host device within a particular proximity.

Clause 10: The method of any one of Clauses 6-9, wherein identifying the execution of the first task comprises obtaining a status of the first host device, the first virtual machine instance, or the first on-demand code execution environment, wherein the status identifies the execution of the first task.

Clause 11: The method of any one of Clauses 6-10, further comprising:
storing the identifier of the first host device and the identifier of the second host device; and
obtaining the identifier of the second host device based on identifying the execution of the first task, wherein initializing the second on-demand code execution environment is based on obtaining the identifier of the second host device.

Clause 12: The method of any one of Clauses 6-11, further comprising:
instructing the first host device to send the results to a destination, wherein the destination comprises a data store or the second host device.

Clause 13: The method of any one of Clauses 6-12, wherein the results comprise streaming data.

Clause 14: The method of any one of Clauses 6-13, wherein communicating the identifier of the first host device or the identifier of the second host device comprises providing the identifier of the second host device to the first host device, wherein the first host device pushes, using the identifier of the second host device, the results to the host device.

Clause 15: The method of any one of Clauses 6-14, wherein the first task and the second task are associated with a directed acyclic graph or a chain.

Clause 16: The method of any one of Clauses 6-15, further comprising:
obtaining a directed acyclic graph from a user computing device, wherein the directed acyclic graph identifies the first task and the second task, wherein obtaining the set of code for execution is based on the directed acyclic graph.

Clause 17: The method of any one of Clauses 6-16, further comprising dynamically assigning the first task to the first virtual machine instance and the second task to the second virtual machine instance.

Clause 18: Non-transitory computer-readable media including computer-executable instructions that, when executed by a computing system, cause the computing system to:
obtain a set of code for execution in a first on-demand code execution environment and a second on-demand code execution environment;
identify a first task and a second task for execution based on the set of code, wherein the first task is associated with the first on-demand code execution environment hosted by a first host device and the second task is associated with the second on-demand code execution environment hosted by a second host device;
cause initialization of the first on-demand code execution environment on a first virtual machine instance for execution of the first task, wherein the execution of the first task causes generation of results;
cause initialization of the second on-demand code execution environment on a second virtual machine instance for execution of the second task based on the results; and
communicate an identifier to the first host device or the second host device to enable the results to be obtained by the second host device, wherein the identifier is associated with the first host device, the second host device, or a data store to which the first host device has stored the results.

Clause 19: The non-transitory computer-readable media of Clause 18, wherein:
the first host device pushes the results to the second host device; or
the second host device pulls the results from the first host device.

Clause 20: The non-transitory computer-readable media of Clause 18 or Clause 19, wherein the computer-executable instructions further cause the computing system to:
select the second host computing device based on a proximity of the second host computing device to the first host computing device.

Various example embodiments of the disclosure can be described by the following clauses:

Clause 1: A system comprising:
a non-transitory data store configured to store computer-executable instructions; and
a computing device in communication with the non-transitory data store, wherein the computer-executable instructions, when executed by the computing device, configure the computing device to:
obtain a set of code for execution in a plurality of on-demand code execution environments;

determine that the set of code is associated with a first task and a second task;

generate a first virtual machine instance provisioned with a first on-demand code execution environment of the plurality of on-demand code execution environments for execution of the first task, wherein the first virtual machine instance is hosted by a first host device;

initialize the first on-demand code execution environment on the first virtual machine instance for execution of the first task, wherein the execution of the first task causes generation of results;

detect the execution of the first task, the first host device storing results of the execution of the first task;

determine that the first task is associated with the second task via the set of code, wherein the second task comprises a task for performance on the results of the first task;

determine a location of the first host device;

compare the location of the first host device storing results of the execution of the first task and a plurality of locations of a plurality of host devices associated with execution of the second task to identify a second host device from the plurality of host devices based on the location of the first host device;

identify a second virtual machine instance hosted by the second host device and provisioned with a second on-demand code execution environment for execution of the second task; and distribute instructions to the second on-demand code execution environment to cause the execution of the second task based on the results.

Clause 2: The system of Clause 1, wherein identifying the second host device is based on location criteria, wherein a proximity between the first host device and the second host device is based on the location criteria.

Clause 3: The system of Clause 1 or Clause 2, wherein the location of the first host device comprises a particular network host, a particular rack, a particular data center, or a particular region.

Clause 4: The system of any one of Clauses 1-3, wherein the computer-executable instructions, when executed by the computing device, further configure the computing device to:
obtain information identifying the plurality of host devices; and
determine each of the plurality of host devices are located within a particular proximity of the first host device,
wherein to identify the second host device, the computer-executable instructions, when executed by the computing device, further configure the computing device to select the second host device from the plurality of host devices.

Clause 5: The system of any one of Clauses 1-4, wherein the computer-executable instructions, when executed by the computing device, further configure the computing device to:
obtain information identifying the plurality of host devices; and
determine each of the plurality of host devices are not located within a particular proximity of the first host device,
wherein to identify the second virtual machine instance, the computer-executable instructions, when executed by the computing device, further configure the computing device to generate the second virtual machine instance hosted by the second host device.

Clause 6: A computer-implemented method comprising:
obtaining a set of code for execution in a plurality of on-demand code execution environments;
determining that the set of code is associated with a plurality of tasks;
causing instantiation of a first virtual machine instance provisioned with a first on-demand code execution environment of the plurality of on-demand code execution environments for execution of a first task of the plurality of tasks, wherein the first virtual machine instance is hosted by a first host device;
initializing the first on-demand code execution environment on the first virtual machine instance for execution of the first task;
detecting the execution of the first task, the first host device storing results of the execution of the first task;
determining a location of the first host device;
comparing the location of the first host device and a plurality of locations of a plurality of host devices to identify a second host device from the plurality of host devices based on the location of the first host device;
causing instantiation of a second virtual machine instance hosted by the second host device and provisioned with a second on-demand code execution environment; and
distributing instructions to the second on-demand code execution environment for the execution of a second task of the plurality of tasks based on the results.

Clause 7: The method of Clause 6, wherein the location of the first host device comprises a particular network host, a particular rack, a particular data center, or a particular region.

Clause 8: The method of Clause 6 or Clause 7, wherein identifying the second host device is based on location criteria, wherein a proximity between the first host device and the second host device is based on the location criteria.

Clause 9: The method of any one of Clauses 6-8, further comprising:
obtaining information identifying a plurality of host devices; and
determining at least one of the plurality of host devices are located within a particular proximity of the first host device,
wherein identifying the second host device comprises selecting the second host device from the at least one of the plurality of host devices.

Clause 10: The method of any one of Clauses 6-9, further comprising:
obtaining information identifying a plurality of host devices; and
determining each of the plurality of host devices are not located within a particular proximity of the first host device,
wherein identifying the second virtual machine instance comprises generating the second virtual machine instance hosted by the second host device.

Clause 11: The method of any one of Clauses 6-10, wherein the first task is dynamically assigned to the first virtual machine instance of a plurality of virtual machine instances and the second task is dynamically assigned to the second virtual machine instance of a subset of the plurality of virtual machine instances based on the location of the first host device.

Clause 12: The method of any one of Clauses 6-11, wherein:
the first host device pushes results of the execution of the first task to the second host device; or
the second host device pulls the results of the execution of the first task from the first host device.

Clause 13: The method of any one of Clauses 6-12, further comprising obtaining location criteria, wherein the location criteria defines a range of proximity between the first host device and the second host device, wherein identifying the second host device is based on the location criteria.

Clause 14: The method of any one of Clauses 6-13, wherein the results comprise first results, the method further comprising:
generating a third virtual machine instance provisioned with a third on-demand code execution environment of the plurality of on-demand code execution environments for execution of a third task of the plurality of tasks, wherein the third virtual machine instance is hosted by a third host device;
initializing the third on-demand code execution environment on the third virtual machine instance for execution of the third task;
detecting the execution of the third task, the third host device storing second results of the execution of the third task;
determining a location of the third host device;
comparing the location of the third host device and the plurality of locations of the plurality of host devices to identify the second host device from the plurality of host devices based on the location of the third host device;
identifying the second virtual machine instance; and
distributing instructions to the second on-demand code execution environment for the execution of a fourth task of the plurality of tasks based on the second results.

Clause 15: The method of any one of Clauses 6-14, wherein the first virtual machine instance and the second virtual machine instance are located within a particular sandbox.

Clause 16: The method of any one of Clauses 6-15, further comprising:
obtaining a directed acyclic graph from a user computing device, wherein the directed acyclic graph identifies the first task and the second task, wherein obtaining the set of code for execution is based on the directed acyclic graph.

Clause 17: The method of any one of Clauses 6-16, wherein the first task and the second task are associated with a directed acyclic graph or a chain.

Clause 18: Non-transitory computer-readable media including computer-executable instructions that, when executed by a computing system, cause the computing system to:
obtain a set of code for execution in a plurality of on-demand code execution environments;
generate a first virtual machine instance provisioned with a first on-demand code execution environment of the plurality of on-demand code execution environments for execution of a first task, wherein the first virtual machine instance is hosted by a first host device;
initialize the first on-demand code execution environment on the first virtual machine instance for execution of the first task;
detect the execution of the first task, the first host device storing results of the execution of the first task;
determine a location of the first host device;
identify a second host device based on comparing the location of the first host device and a location of the second host device;
identify a second virtual machine instance hosted by the second host device and provisioned with a second on-demand code execution environment for execution of a second task; and
distribute instructions to the second on-demand code execution environment for the execution of the second task based on the results.

Clause 19: The non-transitory computer-readable media of Clause 18, wherein the location of the first host device comprises a particular network host, a particular rack, a particular data center, or a particular region.

Clause 20: The non-transitory computer-readable media of Clause 18 or Clause 19, wherein the computer-executable instructions, when executed by the computing system, cause the computing system to obtain location criteria, wherein the location criteria defines a range of proximity between the first host device and the second host device, wherein identifying the second host device is based on the location criteria.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could." "might." or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
    a non-transitory data store configured to store computer-executable instructions; and
    a computing device in communication with the non-transitory data store, wherein the computer-executable instructions, when executed by the computing device, configure the computing device to:
        obtain a set of code for execution in a plurality of on-demand code execution environments;
        determine that the set of code is associated with a first task and a second task;
        cause a first virtual machine instance to be provisioned with a first on-demand code execution environment of the plurality of on-demand code execution environments for execution of the first task, wherein the first virtual machine instance is hosted by a first host device;
        cause the first on-demand code execution environment to be initialized on the first virtual machine instance for execution of the first task, wherein the execution of the first task causes generation of results;
        determine that the first task is associated with the second task via the set of code, wherein the second task comprises a task for performance on the results of the first task;
        cause a second virtual machine instance to be provisioned with a second on-demand code execution environment of the plurality of on-demand code execution environments, wherein the second virtual machine instance is hosted by a second host device;
        cause the second on-demand code execution environment to be initialized on the second virtual machine instance for execution of the second task based on the results; and
        communicate an identifier of the first host device to the second host device or an identifier of the second host device to the first host device, wherein the second on-demand code execution environment obtains the results from the first on-demand code execution environment based on the identifier of the first host device or the identifier of the second host device, wherein execution of the second task causes one or more transformations to the results.

2. The system of claim 1, wherein the computer-executable instructions, when executed by the computing device, further configure the computing device to:
    store the identifier of the first host device and the identifier of the second host device; and
    obtain the identifier of the second host device, wherein causing the second on-demand code execution environment to be initialized is based on obtaining the identifier of the second host device.

3. The system of claim 1, wherein:
    the first host device pushes the results to the second host device; or
    the second host device pulls the results from the first host device.

4. The system of claim 1, wherein to communicate the identifier of the first host device to the second host device or the identifier of the second host device to the first host device, the computer-executable instructions, when executed by the computing device, further configure the computing device to:
    communicate an identifier of the first virtual machine instance to the second virtual machine instance or an identifier of the second virtual machine instance to the first virtual machine instance.

5. The system of claim 1, wherein the first host device and the second host device are a same host device.

6. A computer-implemented method comprising:
obtaining a set of code for execution in a plurality of on-demand code execution environments;
determining that the set of code is associated with a plurality of tasks, wherein a first task of the plurality of tasks is associated with a first on-demand code execution environment of the plurality of on-demand code execution environments and a second task of the plurality of tasks is associated with a second on-demand code execution environment of the plurality of on-demand code execution environments;
generating a first virtual machine instance provisioned with the first on-demand code execution environment and a second virtual machine instance provisioned with the second on-demand code execution environment, wherein the first virtual machine instance is hosted by a first host device and the second virtual machine instance is hosted by a second host device;
initializing the first on-demand code execution environment on the first virtual machine instance for execution of the first task, wherein the execution of the first task causes generation of results;
identifying the execution of the first task;
initializing, based on identifying the execution of the first task, the second on-demand code execution environment on the second virtual machine instance for execution of the second task based on the results; and
communicating an identifier of the first host device to the second host device or an identifier of the second host device to the first host device, wherein the second on-demand code execution environment obtains the results based on the identifier of the first host device or the identifier of the second host device.

7. The method of claim 6, further comprising:
routing, by the first host device, the results to a data store; and
pulling, by the second host device, the results from the data store.

8. The method of claim 6, wherein the first host device pushes the results to the second host device.

9. The method of claim 6, wherein generating the first virtual machine instance and the second virtual machine instance comprises collocating the first host device and the second host device within a particular proximity.

10. The method of claim 6, wherein identifying the execution of the first task comprises obtaining a status of the first host device, the first virtual machine instance, or the first on-demand code execution environment, wherein the status identifies the execution of the first task.

11. The method of claim 6, further comprising:
storing the identifier of the first host device and the identifier of the second host device; and
obtaining the identifier of the second host device based on identifying the execution of the first task, wherein initializing the second on-demand code execution environment is based on obtaining the identifier of the second host device.

12. The method of claim 6, further comprising:
instructing the first host device to send the results to a destination, wherein the destination comprises a data store or the second host device.

13. The method of claim 6, wherein the results comprise streaming data.

14. The method of claim 6, wherein communicating the identifier of the first host device or the identifier of the second host device comprises providing the identifier of the second host device to the first host device, wherein the first host device pushes, using the identifier of the second host device, the results to the second host device.

15. The method of claim 6, wherein the first task and the second task are associated with a directed acyclic graph or a chain.

16. The method of claim 6, further comprising:
obtaining a directed acyclic graph from a user computing device, wherein the directed acyclic graph identifies the first task and the second task, wherein obtaining the set of code for execution is based on the directed acyclic graph.

17. The method of claim 6, further comprising dynamically assigning the first task to the first virtual machine instance and the second task to the second virtual machine instance.

18. Non-transitory computer-readable media including g computer-executable instructions that, when executed by a computing system, cause the computing system to:
obtain a set of code for execution in a first on-demand code execution environment and a second on-demand code execution environment;
identify a first task and a second task for execution based on the set of code, wherein the first task is associated with the first on-demand code execution environment hosted by a first host device and the second task is associated with the second on-demand code execution environment hosted by a second host device;
cause initialization of the first on-demand code execution environment on a first virtual machine instance for execution of the first task, wherein the execution of the first task causes generation of results;
cause initialization of the second on-demand code execution environment on a second virtual machine instance for execution of the second task based on the results; and
communicate an identifier to the first host device or the second host device to enable the results to be obtained by the second host device, wherein the identifier is associated with the first host device, the second host device, or a data store to which the first host device has stored the results.

19. The non-transitory computer-readable media of claim 18, wherein:
the first host device pushes the results to the second host device; or
the second host device pulls the results from the first host device.

20. The non-transitory computer-readable media of claim 18, wherein the computer-executable instructions further cause the computing system to:
select the second host device based on a proximity of the second host device to the first host device.

* * * * *